United States Patent Office 2,724,705
Patented Nov. 22, 1955

2,724,705

MODIFIED POLYESTER RESIN

Robert S. Glover, Jr., Huntington Woods, Mich., assignor to Hercules Powder Company, Wilmington, Del., a corporation of Delaware No Drawing. Application June 24, 1955,
Serial No. 517,900

5 Claims. (Cl. 260—26)

This invention relates to polyesters, and more particularly to copolymers of styrene and unsaturated polyesters containing a substantially petroleum hydrocarbon-insoluble pine wood resin.

Polyesters are well known in the art. They are prepared by the reaction of polyhydric alcohols with polybasic acids and have properties which render them more suitable than melamine resins and phenolics in many applications. However, in certain applications polyester resins exhibit unfavorable characteristics. For example, although the arc resistance of polyesters is considerably greater than that of melamine resins and phenolics, shrinkage of polyester resins on curing is excessive rendering them unsuitable for the production of cast objects of high electrical arc resistance. There has been need of a composition having the desirable properties of polyester resins without the accompanying disadvantageous characteristics of these resins.

Now in accordance with this invention, it has been found that a thermosetting resinous composition having characteristics superior to prior art polyester resins can be obtained from a polymerizable composition comprising about 30–70% polymerizable unsaturated polyester of a polyhydric alcohol and a polycarboxylic acid, about 70–30% polymerizable ethylenically unsaturated monomeric material such as styrene, and about 1–40% substantially petroleum hydrocarbon-insoluble pine wood resin. The quantity of substantially petroleum hydrocarbon-insoluble pine wood resin in the composition will preferably vary from 5–20% by weight. By polymerizing such a composition, for example, a polymerizable polyester-styrene-Vinsol mixture, there is obtained a thermosetting resin having at least the arc resistance of polyester resins of the art, and in addition having greatly reduced shrinkage on curing.

The following example is illustrative of the method of preparing the composition of this invention.

Example

A resinous polyester was prepared by esterifying propylene glycol with fumaric acid and phthalic anhydride in the molar ratio of 3:2:1 until an acid number of 20 was reached. In a mixing vessel 60 parts of the polyester was blended with 38 parts of styrene and 10 parts substantially petroleum hydrocarbon-insoluble pine wood resin. The resulting mixture was polymerized at 60° C. in vacuo using 1% p-menthane hydroperoxide as the catalyst until the polymerized material had a Shore D hardness of 69 at 25° C. The density at 25° C. of the polymerized material was determined and compared with the density of a control polyester-styrene blend polymerized in the same manner to the same hardness. Resulting data showed that the presence of substantially petroleum hydrocarbon-insoluble pine wood resin reduced the shrinkage of the polyester-styrene resin by 17.68%, thus proving the suitability of the compositions of the invention for the production of cast objects of high electrical arc resistance.

Any unsaturated polyester that is polymerizable into an infusible resin at ordinary molding temperatures may be used in the practice of the present invention. Polymerizable unsaturated polyhydric alcohol-polycarboxylic acid polyesters used in the practice of the invention may be prepared by reaction of one or more polyhydric alcohols and one or more polybasic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity (i. e., through cross-linking).

A typical example of a polyester useful in this invention is a product prepared by the reaction of an unsaturated dicarboxylic acid such as maleic, fumaric, itaconic, citraconic or mesaconic acid with a dihydric alcohol such as any polymethylene glycol in the series from ethylene glycol to decamethylene glycol, propylene glycol, any butylene glycol, any polyethylene glyco in the series from diethyene glycol to nonaethylene glycol, dipropylene glycol, any glycerol monobasic acid monoester (in either the alpha or beta position), such as monoformin or monoacetin, any monoether of glycerol with a monohydric alcohol such as monomethylin or monoethylin, or any dihydroxy alkane in which the hydroxy radicals are attached to carbon atoms that are primary or secondary or both, in the series from dihydroxy butane to dihydroxy decane.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentaglycerol, pentaerythritol or butanetetrol-1,2,3,4, a trihydroxy normal alkane having from four to five carbon atoms such as butanetriol-1,2,3 or a monoalkyl ether of pentaerythritol or butanetetrol-1,2,3,4 in which the alkyl radical has from one to four carbon atoms and has from one to two hydrogen atoms attached to the same carbon atom as the ether linkage, such as the monomethyl or monoisobutyl ether of pentaerythritol.

In the practice of the invention the preferred polymerizable unsaturated polyhydric alcohol-polycarboxylic acid polyesters are the so-called "linear" polyesters, i. e. those which have very little cross-linking in the polyester molecules, as evidenced by the fact that such polyesters are soluble in solvents such as acetone. Such polyesters are formed mainly by esterification of a dihydric alcohol and a dibasic acid. Of course, such polyesters are really only "substantially" linear since it is not possible to avoid all cross-linking, at least through the unsaturated bonds in the polyester molecules. In fact, a linear (or substantially linear) polyester may be obtained even though in the preparation of such polyester a small proportion of the dihydric alcohol (e. g., less than about 5 mole per cent of the alcohol) is replaced by a polyhydric alcohol containing more than two alcohol radicals, such as glycerol or pentaerythritol, or a small proportion of the dibasic acid (e. g., less than about 5 mole per cent of the acid) is replaced by a polybasic acid containing more than two acid radicals, such as citric acid. The preferred linear polyester for use in the practice of the invention is prepared by carrying out the esterification reaction substantially to completion (i. e., to an acid number of less than about 40) without permitting substantial (addition) polymerization to take place. Although the esterification reaction is usually carried out under an inert gas atmosphere so as to exclude oxygen, various inhibitors may be used to prevent appreciable polymerization of the polyester during the esterification reaction.

In the preparation of the polymerizable unsaturated polyester, any of the usual modifiers such as monobasic acids and monohydric alcohols may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportion. The infusibility, hardness and inertness of the product obtained by polymerization of the polyester may be increased by varying the initial reacting ingredients to increase the average number of double bonds per molecule of the polymerizable polyester.

The polymerizable, ethylenically unsaturated monomeric compound which is copolymerized with polyester may be any substance containing at least one polymerizable ethylenic double bond and capable of copolymerizing with a polymerizable, unsaturated polyhydric alcohol-polycorboxylic acid polyester. At molding temperatures the monomer aids in curing by cross-linking straight chain polyester molecules. The combination of the polyester and the monomeric compound usually polymerizes more rapidly than either substance alone. When used in proper proportions the monomer improves the water resistance and insolubility of the final product.

Particularly preferred polymerizable ethylenically unsaturated monomeric compounds are vinyl compounds such as p-methyl styrene, 2,4-dimethyl styrene, 2,3-dimethyl styrene, 2,5-dimethyl styrene, α-methyl styrene, vinyl naphthylene, vinyl benzoate, vinyl dibenzofurane or acrylonitrile. Also, alkyl esters or amides of monobasic acids whose molecules contain one ethylenic double bond, or the aldehydes corresponding to such acids, such as methyl acylate, methyl methacrylate, etc., may also be utilized.

The substantially petroleum hydrocarbon-insoluble pine wood resin of this invention is known commercially as "Vinsol" and may be prepared in accordance with the processes of U. S. patents to Hall, Nos. 2,193,026 and 2,221,540. This resinous material may be prepared from pine wood as follows: The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present composition. Extraction of this mixture with a petroleum hydrocarbon such as, for example, gasoline dissolves and removes the rosin. After separation of the rosin, high in abietic acid, a resinous residue remains which is low in abietic acid. Alternatively, the material obtained on evaporation of the coal tar hydrocarbon extract may be dissolved in a mixture of furfural and a petroleum hydrocarbon such as gasoline, and the two layers which form separated, in which case the substantially petroleum hydrocarbon-insoluble resin is found dissolved in the furfural phase from which it may be obtained by evaporation of the furfural. Other methods of isolating the desired petroleum hydrocarbon-insoluble pine wood resin may be employed, if desired. This resin, used in accordance with the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha and toluol-insoluble material, depending upon the details of the extraction processes utilized. This resin will meet or nearly meet the following specifications, namely, substantial insolubility in petroleum hydrocarbons, substantially complete solubility in aromatic hydrocarbons and in alcohol, a methoxy content from about 3% to about 7.5% (usually from about 4% to about 6%), an acid number in the range from about 90 to about 110, and a drop melting point in the range from about 95° C. to about 125° C. (203° F. to 257° F.). This resin is a solid material and comes into commerce in the pulverized or ground form.

In producing the final monomer—polyester—substantially petroleum hydrocarbon-insoluble pine wood resin compositions of this invention, it is desirable to use a peroxidic catalyst. It has been found, however, that ordinary peroxides such as benzoyl peroxide are deactivated by the presence of a phenolic material such as the substantially petroleum hydrocarbon-insoluble pine wood resin. On the other hand, hydroperoxides are useful catalysts and saturated cyclic hydroperoxides of the type of p-menthane hydroperoxide are very active catalysts in the preparation of products of this invention and seem to be uninhibited by the presence of phenolic materials. Similarly, other saturated cyclic hydroperoxides such as hydroperoxides obtained by oxidation of hydrocarbons such as diisopropylcyclohexane, phenylcyclohexane, partially hydrogenated terphenyl, and their isomers and homologs, may be advantageously utilized.

One of the important applications for polyester resins lies in the production of polyester thermosetting paper laminated sheets for use in punch stock. Due to the low pressure required for the cure of polyester-styrene resins, laminated papers may be produced continuously and because of resin flexibility can be sold in rolls rather than sheets. Since fabricators can buy the materials in rolls they may use automatic self-feeding punching machines. The modified polyester-styrene resins of this invention are readily adaptable to this application and, because of reduced shrinkage as compared with ordinary polyester-styrene resins, are particularly useful in the preparation of casting resins, especially those containing inserts. In this latter application shrinkage is obviously a very undesirable characteristic.

This application is a continuation-in-part of application Serial Number 307,395, filed August 30, 1952, now abandoned.

What I claim and desire to protect by Letters Patent is:

1. A polymerizable composition comprising about 30–70% polymerizable unsaturated polyester of a polyhydric alcohol and a polycarboxylic acid, about 70–30% polymerizable ethylenically unsaturated monomeric compound capable of copolymerizing with said polyester and about 1–40% substantially petroleum hydrocarbon-insoluble pine wood resin by weight.

2. A polymerizable composition comprising about 30–70% polymerizable unsaturated polyester of a polyhydric alcohol and a polycarboxylic acid, about 70–30% polymerizable ethylenically unsaturated monomeric compound capable of copolymerizing with said polyester and about 5–20% substantially petroleum hydrocarbon-insoluble pine wood resin by weight.

3. The composition of claim 2 wherein the polymerizable unsaturated monomeric compound is styrene.

4. The composition of claim 2 wherein the polymerizable unsaturated monomeric compound is p-methyl styrene.

5. The composition of claim 2 wherein the polymerizable unsaturated monomeric compound is α-methyl styrene.

No references cited.